United States Patent
Hagiwara

(10) Patent No.: US 12,248,195 B2
(45) Date of Patent: Mar. 11, 2025

(54) LENS DRIVING DEVICE, CAMERA DEVICE, AND ELECTRONIC APPARATUS

(71) Applicant: New Shicoh Motor Co., Ltd., Zhejiang (CN)

(72) Inventor: Kazuyoshi Hagiwara, Kanagawa (JP)

(73) Assignee: New Shicoh Motor Co., Ltd., Jiashan (CN)

( * ) Notice: Subject to any disclaimer, the term of this patent is extended or adjusted under 35 U.S.C. 154(b) by 622 days.

(21) Appl. No.: 17/542,672

(22) Filed: Dec. 6, 2021

(65) Prior Publication Data

US 2022/0206245 A1 Jun. 30, 2022

(30) Foreign Application Priority Data

Dec. 25, 2020 (CN) .......................... 202011565678.6

(51) Int. Cl.
*G02B 7/09* (2021.01)
*G03B 13/36* (2021.01)

(52) U.S. Cl.
CPC .............. *G02B 7/09* (2013.01); *G03B 13/36* (2013.01)

(58) Field of Classification Search
CPC ........ G02B 7/09; G02B 13/001; G02B 7/021; G03B 13/36; G03B 17/08; G03B 3/10; G03B 30/00; G03B 2205/0069
See application file for complete search history.

(56) References Cited

U.S. PATENT DOCUMENTS

| | | | | |
|---|---|---|---|---|
| 10,983,298 | B2* | 4/2021 | Kim | G02B 7/023 |
| 2015/0168685 | A1* | 6/2015 | Kasuga | H04N 23/57 |
| | | | | 348/374 |
| 2019/0121053 | A1 | 4/2019 | Hagiwara | |
| 2020/0236257 | A1* | 7/2020 | Liu | G02B 27/646 |

FOREIGN PATENT DOCUMENTS

| | | |
|---|---|---|
| JP | 2010-190923 | 9/2010 |
| JP | 2019-78850 | 5/2019 |

OTHER PUBLICATIONS

Notification of Office Action Dated May 6, 2024 From The State Intellectual Property Office of the People's Republic of China Re. Application No. 202011565678.6 and Its Translation Into English. (9 Pages).

\* cited by examiner

*Primary Examiner* — Mustak Choudhury

(57) ABSTRACT

A lens driving device includes a movable body including a lens support body and a fixed body for supporting the movable body so as to be able to move in an optical axis direction of a lens. The fixed body includes a through hole, and an opposing face is formed at a periphery of the through hole in a direction orthogonal to the optical axis direction and opposing the movable body. The opposing face has a protrusion protruding toward the movable body side at a peripheral edge of the through hole, and a recess at a periphery of the protrusion and recessed toward the movable body side. The movable body includes an opening to let light from the lens pass through and a flat face formed at a periphery of the opening in a direction orthogonal to the optical axis direction and disposed opposing the protrusion and the recess.

9 Claims, 12 Drawing Sheets

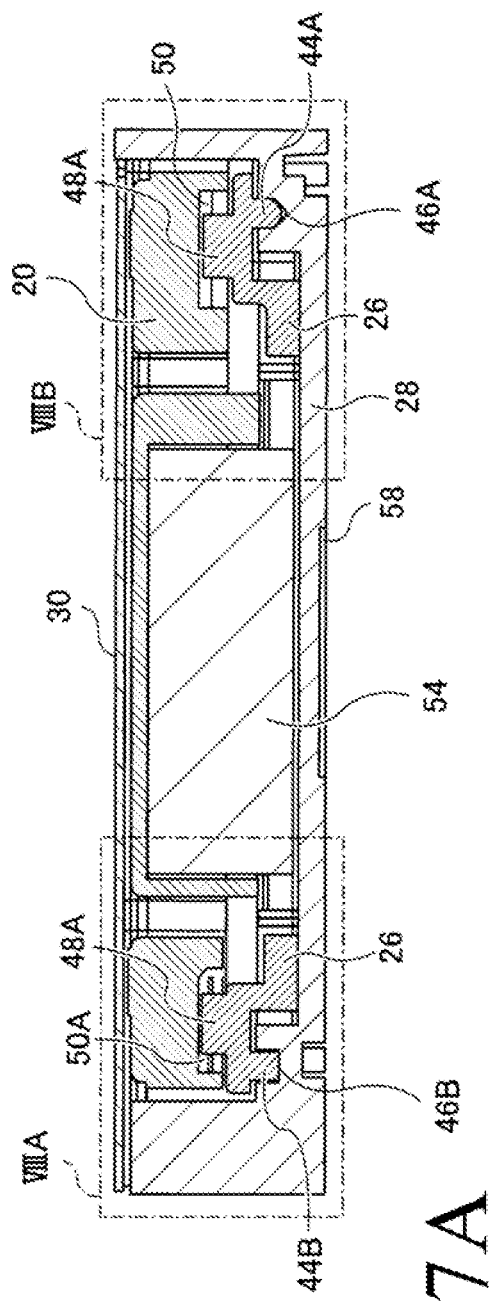
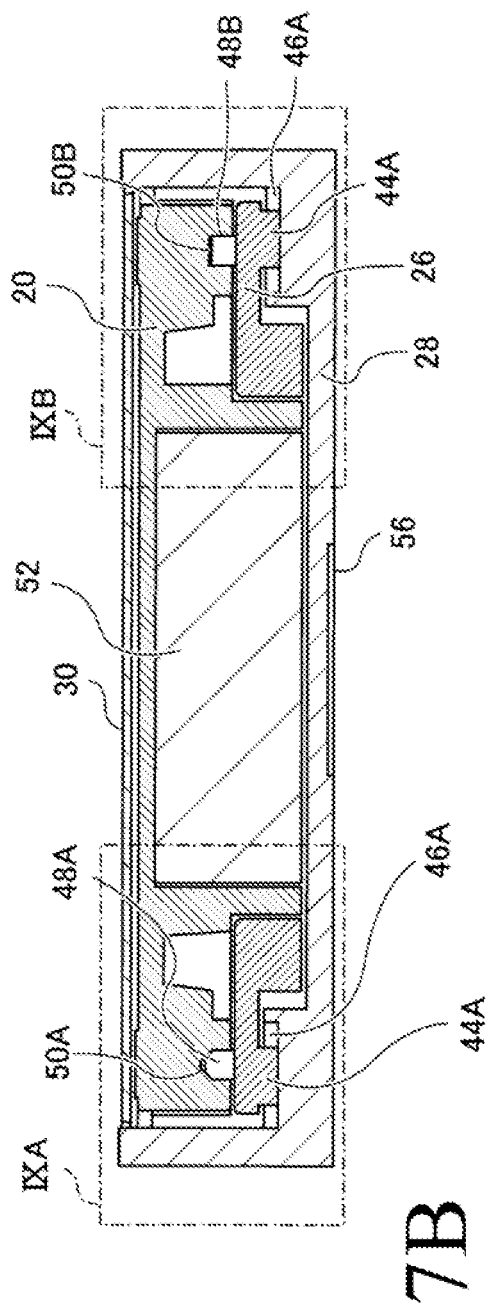
FIG. 7A
FIG. 7B

LENS DRIVING DEVICE, CAMERA DEVICE, AND ELECTRONIC APPARATUS

CROSS-REFERENCES TO RELATED APPLICATIONS

This application claims priority to Chinese Patent Application No. 202011565678.6 filed on Dec. 25, 2020; and the entire contents of which are incorporated by reference herein.

TECHNICAL FIELD

The present invention relates to a lens driving device, a camera device, and an electronic apparatus.

BACKGROUND ART

Electronic apparatuses such as mobile telephones, smartphones and the like are installed with small camera devices. Such small cameras may, for example, include autofocus functionality such as that described in Japanese Patent Application Laid-Open (JP-A) No. 2019-78850.

SUMMARY

The lens driving device described in Japanese Patent Application Laid-Open (JP-A) No. 2019-78850 includes a fixed body, and a movable body supported so as to be able to move in an optical axis direction with respect to the fixed body. A guide mechanism is provided for moving the movable body in the optical axis direction. Moreover, through holes are formed in the fixed body to allow light from a lens supported by the movable body to pass through, and the light that has passed through this through hole becomes light focused on an image sensor.

Sometimes movement of the movable body in an up-down direction results in dust at the movable body vicinity falling from the through hole in the fixed body through to the image sensor side.

An object of the present invention is to provide a lens driving device, a camera device, and an electronic apparatus capable of resolving the existing issues described above and reducing dust falling through to the image sensor side.

A lens driving device of an aspect of the present invention is a lens driving device including a movable body including a lens support body, and a fixed body configured to support the movable body so as to be able to move in an optical axis direction of a lens. The fixed body includes a through hole through which light from the lens passes, and an opposing face formed at a periphery of the through hole in a direction orthogonal to the optical axis direction and opposing the movable body. The opposing face is provided with a protrusion protruding toward the movable body side at a peripheral edge of the through hole, and a recess at the periphery of the protrusion and recessed toward the movable body side. The movable body includes an opening to let light from the lens pass through and a flat face formed at a periphery of the opening in a direction orthogonal to the optical axis direction and disposed opposing the protrusion and the recess.

Preferably the opposing face is further provided with a body portion disposed peripherally outside the recess and having a height intermediate between heights of the protrusion and the recess.

Preferably a passage for letting air escape is formed at a periphery of the body portion of the fixed body.

Preferably an upper inside end of the protrusion is disposed further inside than a lower inside end of the movable body where the flat face is formed.

Preferably the lower inside end of the movable body where the flat face is formed is beveled so as to provide a beveled portion, and the beveled portion opposes the protrusion in the optical axis direction.

Preferably an upper inside end of the protrusion includes a corner portion.

Moreover, preferably the movable body includes a first movable body plate configured to support the lens support body so as to be able to move in a direction orthogonal to the optical axis direction, and a second movable body plate configured to support the first movable body plate so as to be able to move in a direction orthogonal to the movement direction of the first movable body plate, and the second movable body plate opposes the fixed body.

Preferably the lens support body, the first movable body plate, and the second movable body plate are provided so as to overlap with each other in the optical axis direction and such that gaps are formed between each other.

Another aspect of the present invention is a camera device. The camera device includes the lens driving device, and a lens supported by the lens support body.

Another aspect of the present invention is an electronic apparatus. The electronic apparatus includes the camera device.

Advantageous Effects of Invention

According to the present invention, the fixed body includes the opposing face formed at a periphery of the through hole in a direction orthogonal to the optical axis direction and opposing the movable body. The opposing face is provided with a protrusion protruding toward the movable body side at a peripheral edge of the through hole, and with a recess peripherally outside the protrusion and recessed toward the movable body side. The movable body includes the flat face formed at a periphery of the opening in a direction orthogonal to the optical axis direction and disposed opposing the protrusion and the recess. Thus dust in the vicinity of the movable body is caught by the recess, and leakage to the through hole side can be reduced by the protrusion. This enables a reduction in dust falling through to the image sensor side.

BRIEF DESCRIPTION OF DRAWINGS

FIG. 7A is a cross-section as sectioned along line VIIA-VIIA in FIG. 6;

FIG. 7B is a cross-section as sectioned along line VIIB-VIIB in FIG. 6;

DESCRIPTION OF EMBODIMENTS

Explanation follows regarding an exemplary embodiment of the present invention, with reference to the drawings. Note that although the following exemplary embodiment describes an example of a lens driving device, a camera device, and an electronic apparatus of the present invention, there is no intention that the present invention should be limited to the following exemplary embodiment.

Figure 1:
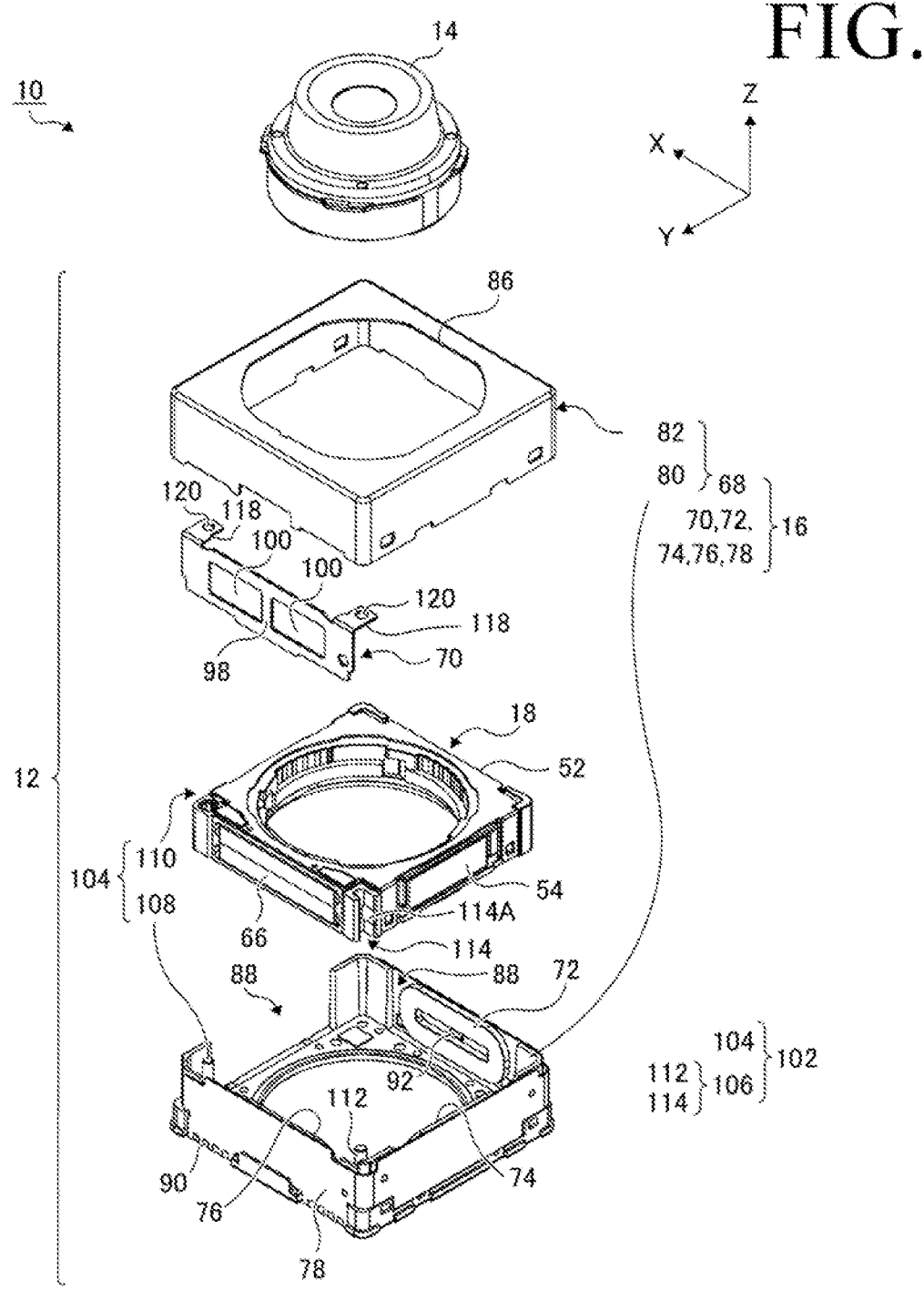
FIG. 1 is an exploded perspective view illustrating a camera device 10 of an exemplary embodiment of the present invention as viewed obliquely from above.

FIG. 1 illustrates a camera device 10 according to the present exemplary embodiment of the present invention. The camera device 10 is installed in an electronic apparatus such as a mobile telephone or a smartphone, and includes a lens driving device 12 and a lens 14 mounted to the lens driving device 12.

Note that in the following explanation, for ease of explanation an optical axis direction of the lens 14 is referred to as the Z direction, one direction orthogonal to the Z direction is referred to as the X direction, and a direction orthogonal to both the Z direction and the X direction is referred to as the Y direction. An imaging subject side of the optical axis (corresponding to the upper side in FIG. 1) is referred to as the upper side, and the opposite side thereto, this being the side on which a non-illustrated image sensor is disposed, is referred to as the lower side.

The lens driving device 12 includes a fixed body 16 and a movable body 18 supported by the fixed body 16 so as to be able to move in the optical axis direction. The movable body 18 is disposed within the fixed body 16.

Figure 2:
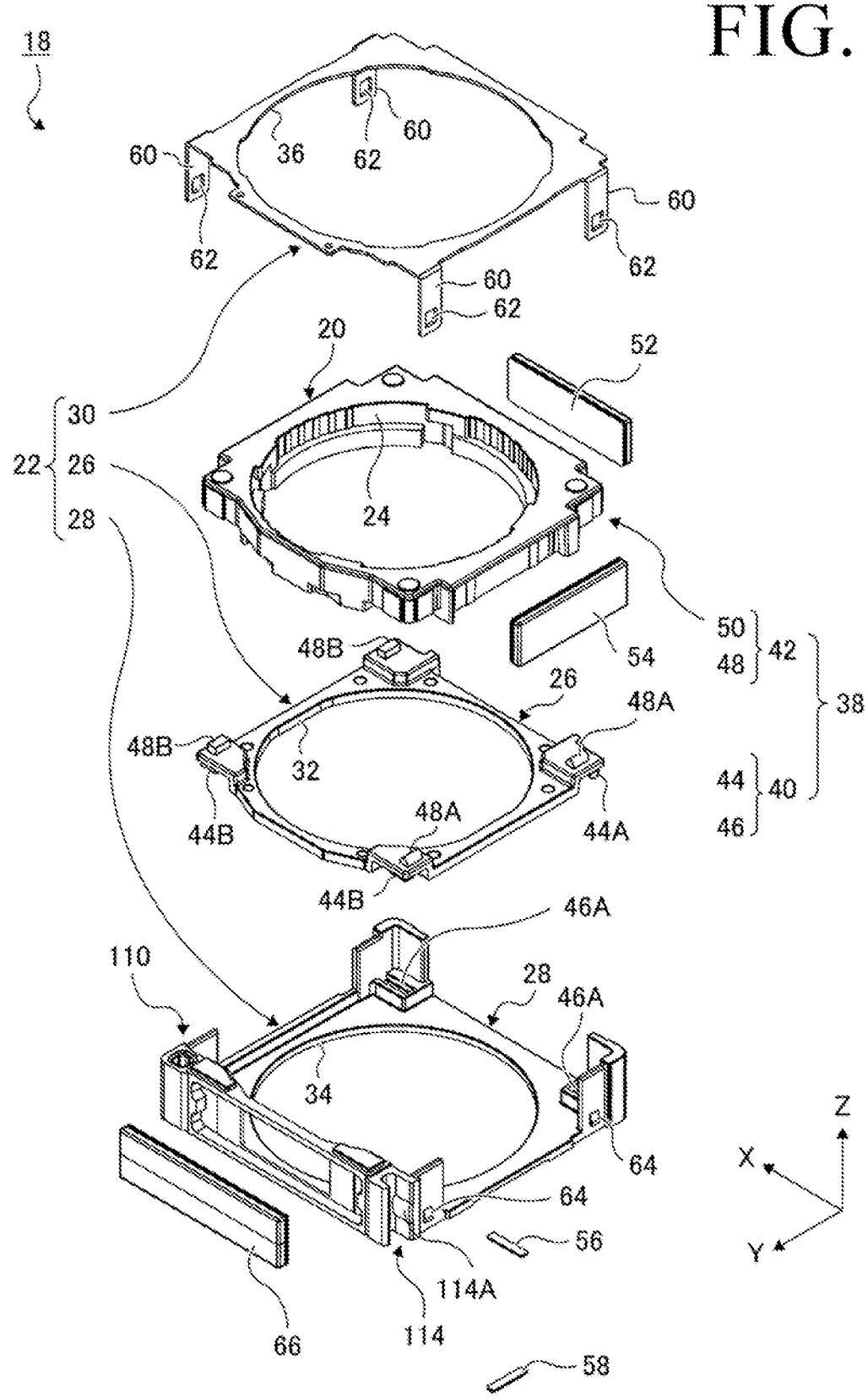
FIG. 2 is an exploded perspective view illustrating a movable body 18 configuring the camera device 10 in FIG. 1 as viewed obliquely from above.
Figure 3:
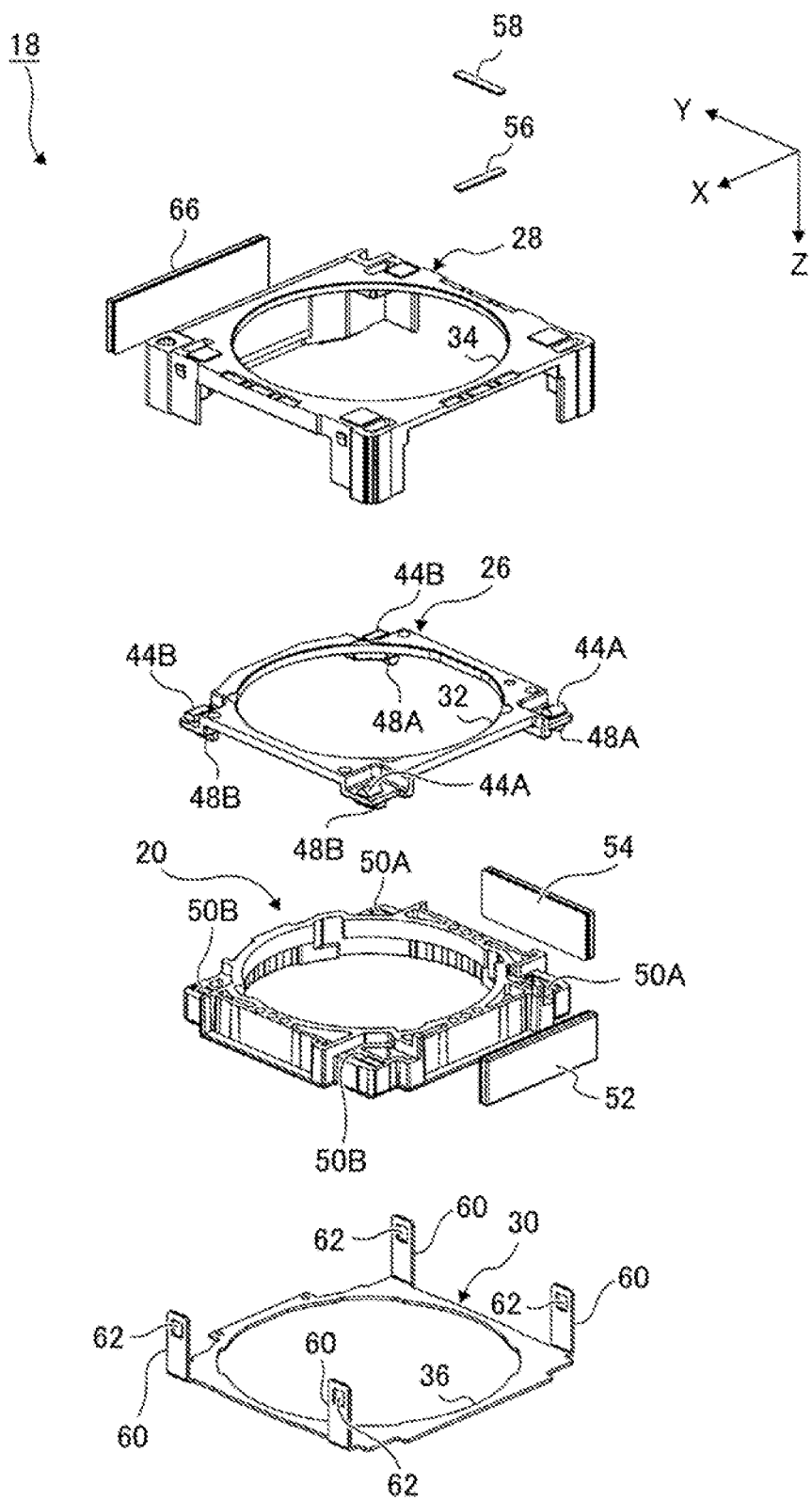
FIG. 3 is an exploded perspective view illustrating the movable body 18 in FIG. 2 as viewed obliquely from below.

As illustrated in FIG. 2 and FIG. 3, the movable body 18 includes a lens support body 20 to support the lens 14, and a first frame 22 configuring a frame that surrounds the periphery of the lens support body 20. The lens support body 20 and the first frame 22 each have a substantially square external profile as viewed from above.

A lens attachment hole 24 with a circular shape when viewed along the Z direction is formed penetrating through the inside of the lens support body 20 from the upper side to the lower side. The lens 14 is attached in the lens attachment hole 24.

The first frame 22 includes the first movable body plate 26, the second movable body plate 28, and the first cover 30 each having a substantially square external profile as viewed from above. The first movable body plate 26 and the second movable body plate 28 are, for example, formed from an engineering plastic such as a liquid crystal polymer (LCP), a polyacetal, a polyamide, a polycarbonate, a modified polyphenylene ether, a polybutylene terephthalate, or the like. The first cover 30 is formed from a metal, for example. Openings 32, 34, 36 are respectively formed so as to penetrate through the first movable body plate 26, the second movable body plate 28, and the first cover 30 from the upper side to the lower side so as to allow light to pass through. The openings 32, 34, 36 are each a substantially circular shape.

The first frame 22 supports the lens support body 20 so as to allow the lens support body 20 to move in both the X direction, corresponding to a first direction, and the Y direction, corresponding to a second direction. Specifically, the lens support body 20 and the first frame 22 are provided with an orthogonal direction guide mechanism 38 configuring a guide mechanism, and support the lens support body 20 with respect to the second movable body plate 28, this being a specific member configuring a frame, such that the lens support body 20 is able to move in both the X direction and the Y direction. The orthogonal direction guide mechanism 38 is configured by a first guide mechanism 40 provided on one side (a lower side) in the Z direction, and a second guide mechanism 42 provided on the other side (an upper side) in the Z direction.

The first guide mechanism 40 is configured by lower side guide projections 44 formed protruding in a -Z direction from a lower face of the first movable body plate 26, and lower side guide grooves 46 formed recessed toward the -Z direction in an upper face of the second movable body plate 28 so as to allow the lower side guide projections to fit therein. The lower side guide projections 44 and the lower side guide grooves 46 are each formed so as to extend along the X direction in the vicinities of the four corners of the first movable body plate 26 and the second movable body plate 28.

Since the lower side guide projections 44 and the lower side guide grooves 46 each extend along the X direction, relative movement is possible in the X direction only, whereas movement in the Y direction is restricted. Accordingly, the first movable body plate 26 is able to move in the X direction only with respect to the second movable body plate 28, and is restricted from moving in the Y direction. Namely, the first guide mechanism 40 enables the lens support body 20 to move together with the first movable body plate 26 in the X direction with respect to the second movable body plate 28.

The lower side guide projections 44 and the lower side guide grooves 46 are disposed on one side and the other side in the Y direction, this being a direction orthogonal to the movement direction of the first movable body plate 26. Specifically, the lower side guide projections 44 include two lower side guide projections 44A, 44A provided on the one side in the Y direction (a -Y side), and two lower side guide projections 44B, 44B provided on the other side in the Y direction (a +Y side). The lower side guide grooves 46 include two lower side guide grooves 46A, 46A provided on the one side in the Y direction, and two lower side guide grooves 46B, 46B provided on the other side in the Y direction.

Figure 8B:
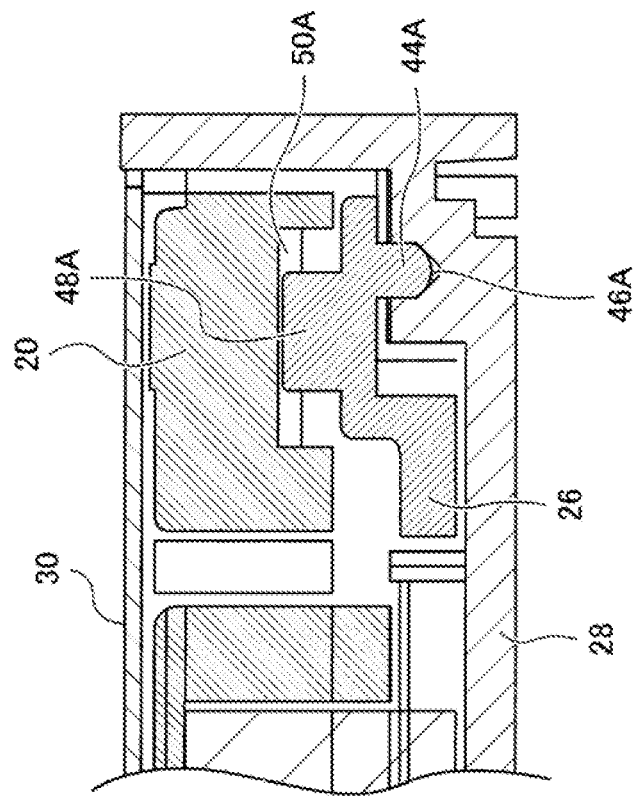
FIG. 8B is an enlarged cross-section of the portion VIIIB in FIG. 7A.

As illustrated in FIG. 7A and FIG. 8B, as viewed along the X direction, the lower side guide grooves 46A, 46A on the one side in the Y direction each have a V-shaped profile inclined so as to narrow in width on progression toward the groove bottoms with the widths of the lower side guide grooves 46A, 46A decreasing on progression toward their groove bottoms. The lower side guide projections 44A, 44A each have a semicircular profile. Accordingly, arc shaped portions of the lower side guide projections 44A, 44A and linear portions of the lower side guide grooves 46A, 46A make line contact with one another at two locations each. A space is formed between the lower side guide grooves 46A, 46A and the corresponding lower side guide projections 44A, 44A in a region between the positions of the two locations of line contact and the corresponding groove bottom. The lower side guide projections 44A, 44A may each have a rectangular cross-section profile, in which case the lower side guide grooves 46A, 46A may each have either a V-shaped or a U-shaped cross-section profile. By making line contact at two locations, the Y direction positions of the lower side guide projections 44A, 44A are precisely defined with respect to the lower side guide grooves 46A, 46A.

Figure 8A:
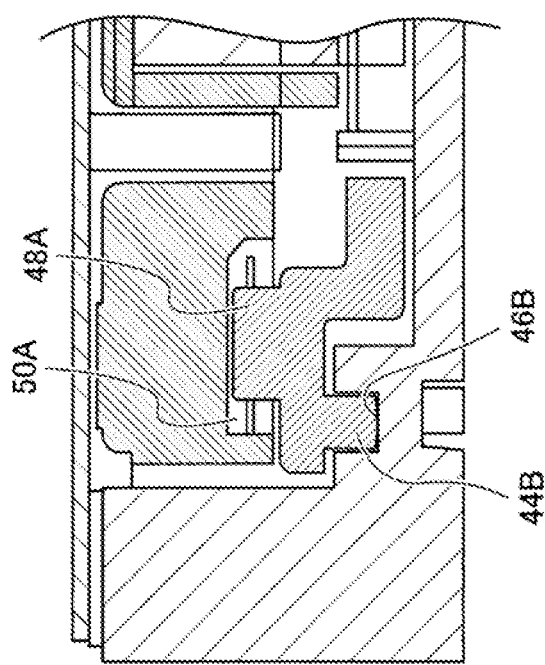
FIG. 8A is an enlarged cross-section of the portion VIIIA in FIG. 7A.

As illustrated in FIG. 7A and FIG. 8A, as viewed along the X direction, the lower side guide projections 44B, 44B and the lower side guide grooves 46B, 46B on the other side in the Y direction each have a rectangular profile. Namely, groove bottoms of the lower side guide grooves 46B, 46B include planar faces extending in a direction orthogonal to the direction in which the lower side guide projections 44B, 44B and the lower side guide grooves 46B, 46B extend, and the lower side guide projections 44B, 44B includes planar faces that make face-to-face contact with these planar faces. Accordingly, the lower side guide projections 44B, 44B and the lower side guide grooves 46B, 46B on the other side in the Y direction make face-to-face contact with each other. This enables the Z direction height of the first movable body plate 26 to be defined with respect to the second movable body plate 28. The planar faces of the lower side guide grooves 46B, 46B are wider than the lower side guide projections 44B, 44B. Accordingly, assembly is still possible even if tolerances during manufacturing result in a difference between the distance between the lower side guide projections 44A, 44A and the lower side guide projections 44B, 44B and the distance between the lower side guide grooves 46A, 46A and the lower side guide grooves 46B, 46B, enabling the first movable body plate 26 to still move smoothly.

The second guide mechanism 42 is configured from upper side guide projections 48 formed protruding in a +Z direction from an upper face of the first movable body plate 26, and upper side guide grooves 50 formed recessed toward the +Z direction in a lower face of the lens support body 20 so as to allow the upper side guide projections 48 to fit therein. The upper side guide projections 48 and the upper side guide grooves 50 are formed so as to extend along the Y direction in the vicinities of the four corners of the first movable body plate 26 and the lens support body 20.

Since the upper side guide projections 48 and the upper side guide grooves 50 extend along the Y direction, relative movement is permitted in the Y direction only, and movement in the X direction is restricted. Accordingly, the lens support body 20 is able to move in the Y direction only with respect to the first movable body plate 26, and is restricted from moving in the X direction. Namely, the second guide mechanism 42 enables the lens support body 20 to move in the Y direction with respect to the first movable body plate 26. The lens support body 20 is accordingly able to move in both the X direction and the Y direction with respect to the second movable body plate 28. Moreover, the first guide mechanism 40 and the second guide mechanism 42 configure independent guide mechanisms, and force is not applied in a rotation direction about the Z direction even if drive is performed simultaneously in the X and Y directions, thereby enabling the lens support body 20 to be prevented from oscillating in the rotation direction.

The upper side guide projections 48 and the upper side guide grooves 50 are disposed on one side and the other side in the X direction, this being a direction orthogonal to the movement direction of the lens support body 20. Specifically, the upper side guide projections 48 include two upper side guide projections 48A, 48A provided on the one side in the X direction (a −X side), and two upper side guide projections 48B, 48B provided on the other side in the X direction (a +X side). The upper side guide grooves 50 include two upper side guide grooves 50A, 50A provided on the one side in the X direction, and two upper side guide grooves 50B, 50B provided on the other side in the X direction.

Figure 9B:
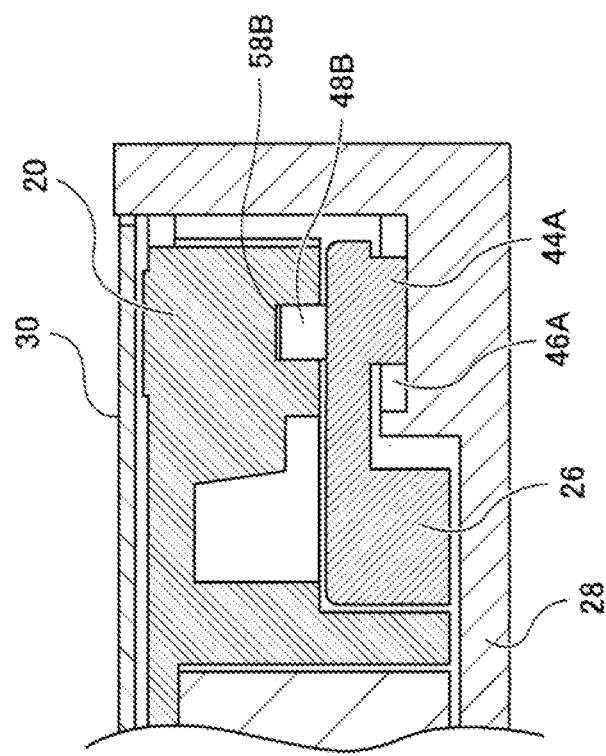
FIG. 9B is an enlarged cross-section of the portion IXB in FIG. 7B.
Figure 9A:
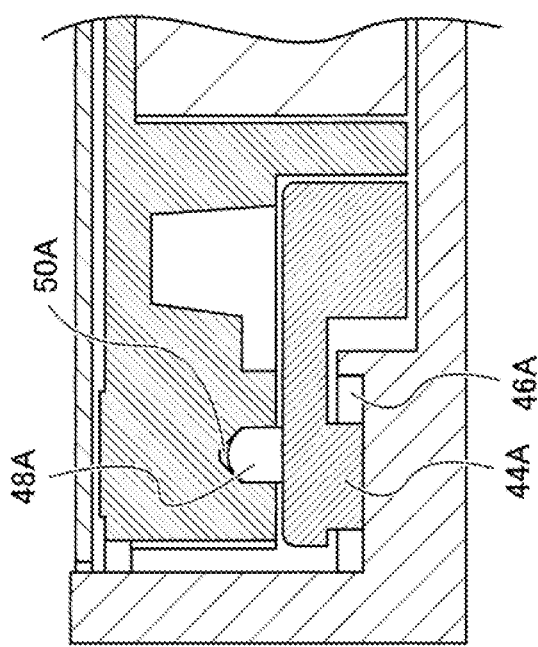
FIG. 9A is an enlarged cross-section of the portion IXA in FIG. 7B.

As illustrated in FIG. 7B and FIG. 9A, as viewed along the Y direction, the upper side guide grooves 50A, 50A on the one side in the X direction each have a V-shaped profile inclined so as to narrow in width on progression toward the groove bottoms with the widths of the upper side guide grooves 50A, 50A decreasing on progression toward their groove bottoms. The upper side guide projections 48A, 48A each have a semicircular profile. Accordingly, arc shaped portions of the upper side guide projections 48A, 48A and linear portions of the upper side guide grooves 50A, 50A make line contact with one another at two locations each. A space is formed between the upper side guide projections 48A, 48A and the corresponding upper side guide grooves 50A, 50A in a region between the positions of the two locations of line contact and the corresponding groove bottom. The upper side guide projections 48A, 48A may each have a rectangular cross-section profile, in which case the upper side guide grooves 50A, 50A may each have either a V-shaped or a U-shaped cross-section profile. By making line contact at two locations each, the X direction positions of the upper side guide grooves 50A, 50A are precisely defined with respect to the upper side guide projections 48A, 48A.

As illustrated in FIG. 7B and FIG. 9B, as viewed along the Y direction, the upper side guide projections 48B, 48B and the upper side guide grooves 50B, 50B on the other side in the X direction each have a rectangular profile. Namely, groove bottoms of the upper side guide grooves 50B, 50B include planar faces extending in a direction orthogonal to the direction in which the upper side guide projections 48B, 48B and the upper side guide grooves 50B, 50B extend, and the upper side guide projections 48B, 48B include planar faces that make face-to-face contact with these planar faces. Accordingly, the upper side guide projections 48B, 48B and the upper side guide grooves 50B, 50B that are on the other side in the X direction make face-to-face contact with each other. This enables the Z direction height of the lens support body 20 to be defined with respect to the first movable body plate 26. The planar faces of the upper side guide grooves 50B, 50B are wider than the upper side guide projections 48B, 48B. Accordingly, assembly is still possible even if tolerances during manufacturing results a difference between the distance between the upper side guide projections 48A, 48A and the upper side guide projections 48B, 48B and the distance between the upper side guide grooves 50A, 50A and the upper side guide grooves 50B, 50B, enabling the lens support body 20 to move smoothly.

A plate shaped first magnet 52 and a plate shaped second magnet 54 are fixed to outer sides of the lens support body 20. The first magnet 52 is disposed with its plate faces facing along the Y direction on the one side in the Y direction, this being the side where the lower side guide projections 44A. 44A and the lower side guide grooves 46A, 46A make line contact with each other. The second magnet 54 is disposed with its plate faces facing along the X direction on the one side in the X direction, this being the side where the upper side guide projections 48A, 48A and the upper side guide grooves 50A, 50A make line contact with each other. The S pole of the first magnet 52 is provided on one of the plate faces facing in the Y direction, and the N pole is provided on the other of these plate faces. The S pole of the second magnet 54 is provided on one of the plate faces facing in the X direction, and the N pole is provided on the other of these plate faces.

A first magnetic member 56 and a second magnetic member 58, each configured by a magnetic body, are disposed at a lower face of the second movable body plate 28. The first magnetic member 56 is disposed on the one side in the Y direction so as to run along the X direction parallel to the first magnet 52. The second magnetic member 58 is disposed on the one side in the X direction so as to run along the Y direction parallel to the second magnet 54. Accordingly, the first magnetic member 56 opposes the first magnet 52 in the Z direction across the second movable body plate 28, and similarly the second magnetic member 58 opposes the second magnet 54 in the Z direction across the second movable body plate 28.

The first magnet 52 and the first magnetic member 56 on the one side in the Y direction are disposed between a set of one of the lower side guide projections 44A and one of the lower side guide grooves 46A and a set of the other of the lower side guide projections 44A and the other of the lower side guide grooves 46A, and attract one another. The lower side guide projections 44A, 44A and the lower side guide grooves 46A, 46A that are in line contact with one another accordingly make firmer contact with one another than they would were the first magnet 52 and the first magnetic member 56 to be disposed at other positions, enabling more precise positioning to be performed in the Y direction.

The second magnet 54 and the second magnetic member 58 on the one side in the X direction are disposed between a set of one of the upper side guide projections 48A and one of the upper side guide grooves 50A and a set of the other of the upper side guide projections 48A and the other of the upper side guide grooves 50A, and attract one another. The upper side guide grooves 50A, 50A and the upper side guide projections 48A, 48A that are in line contact with one another accordingly make firmer contact with one another than they would were the second magnet 54 and the second magnetic member 58 to be disposed at other positions, enabling more precise positioning to be performed in the X direction.

Attachment portions 60 are provided extending downward in the Z direction at the four corners of the first cover 30. Each of the attachment portions 60 is formed with a square attachment hole 62. Counterpart attachment portions 64 are formed protruding sideways at the four corners of the second movable body plate 28. The counterpart attachment portions 64 fit into the respective attachment holes 62 so as to fix the first cover 30 to the second movable body plate 28. Note that as illustrated in FIG. 7A and FIG. 7B, a minimum required gap to allow for error arising due to tolerance or the like is present between a lower face of the first cover 30 and an upper face of the lens support body 20. The lens support body 20, the first movable body plate 26, and the second movable body plate 28 are thus restricted from moving excessively away from one another even when subjected to shock.

A plate shaped third magnet 66 is fixed to an outer face on the +Y side of the second movable body plate 28, this being the opposite side to the side where the first magnet 52 is provided. Plate faces of the third magnet 66 face in the Y direction. The third magnet 66 is divided into two parts, namely a Z direction upper side part and a Z direction lower side part. The S pole and the N pole are provided at the plate faces of the third magnet 66 and are disposed such that their polarities are opposite above and below.

As illustrated in FIG. 1, the fixed body 16 includes a second frame 68 provided with a base 80 and a second cover 82, a third magnetic member 70 attached to the second frame 68, a first coil 72, a second coil 74, a third coil 76, and a flexible printed substrate 78. The base 80 and the second cover 82 are each configured from a resin or a non-magnetic metal, and each have a square profile as viewed along the Z direction from above. The second cover 82 is fitted over the outside of the base 80 in order to configure the second frame 68. The second frame 68 surrounds the periphery of the first frame 22 of the movable body 18. The base 80 and the second cover 82 are formed with respective through holes 84, 86 to allow light to pass or to allow insertion of the lens 14.

Figure 4:
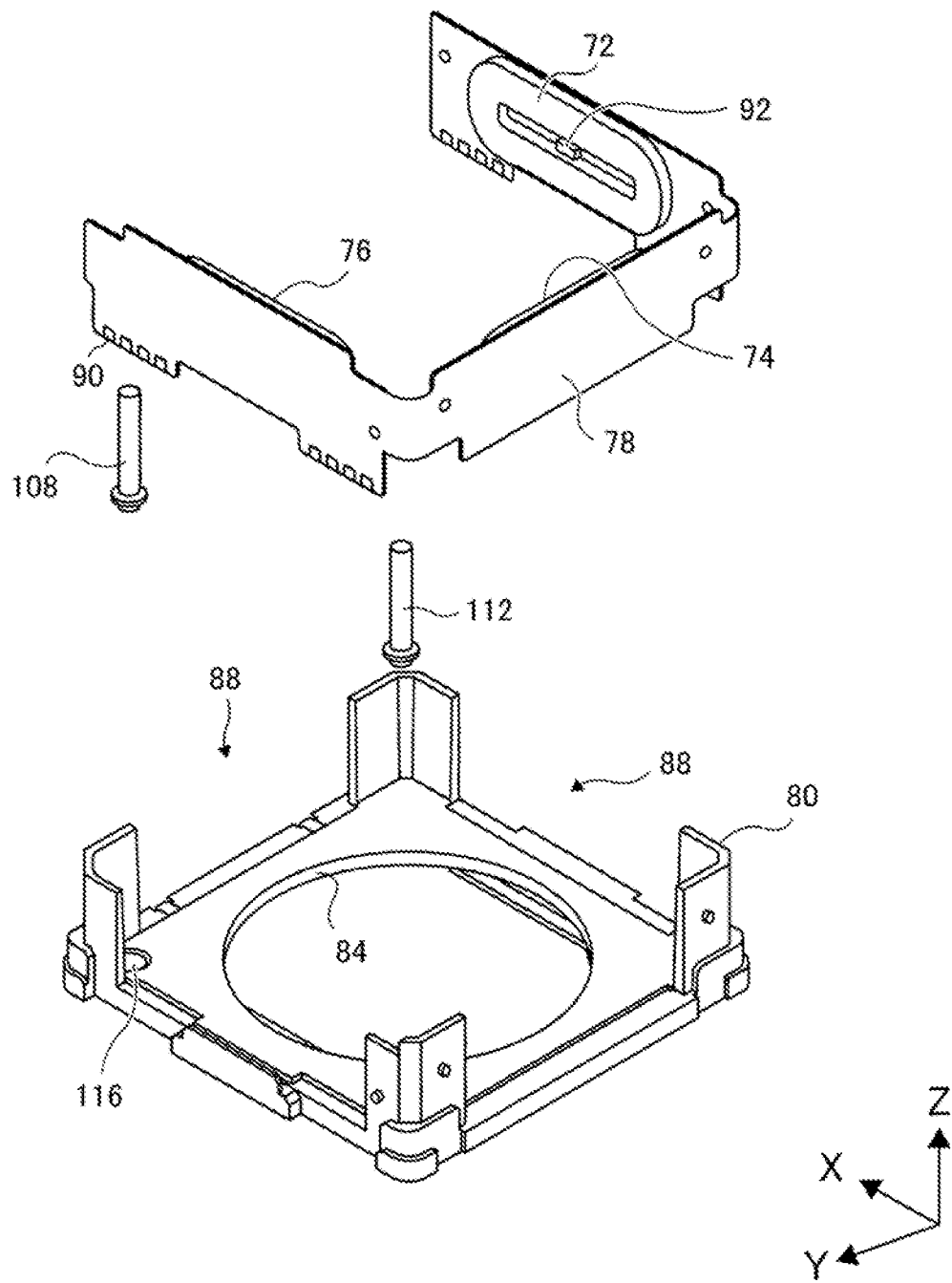
FIG. 4 is an exploded perspective view illustrating part of a fixed body 16 employed in the camera device 10 of an exemplary embodiment of the present invention, as viewed obliquely from above.

As illustrated in FIG. 1 and FIG. 4, openings 88 that are open toward the Z direction upper side are respectively formed in the four side faces of the base 80. The above-mentioned flexible printed substrate 78 is disposed so as to surround three of the side faces of the base 80. Namely, the flexible printed substrate 78 is folded in an angular C shape so as to enclose the two side faces of the base 80 that run orthogonally to the Y direction and one of the side faces (the side face on the −X side) of the base 80 that runs orthogonally to the X direction.

The first coil 72 and the third coil 76 are fixed at the inside of the flexible printed substrate 78 to the two faces that run orthogonally to the Y direction, and the second coil 74 is fixed to the one face that runs orthogonally to the X direction. A Z direction lower portion of the flexible printed substrate 78 is provided with terminals 90, and current supply, signal output, and the like are performed through the terminals 90.

Figure 5:
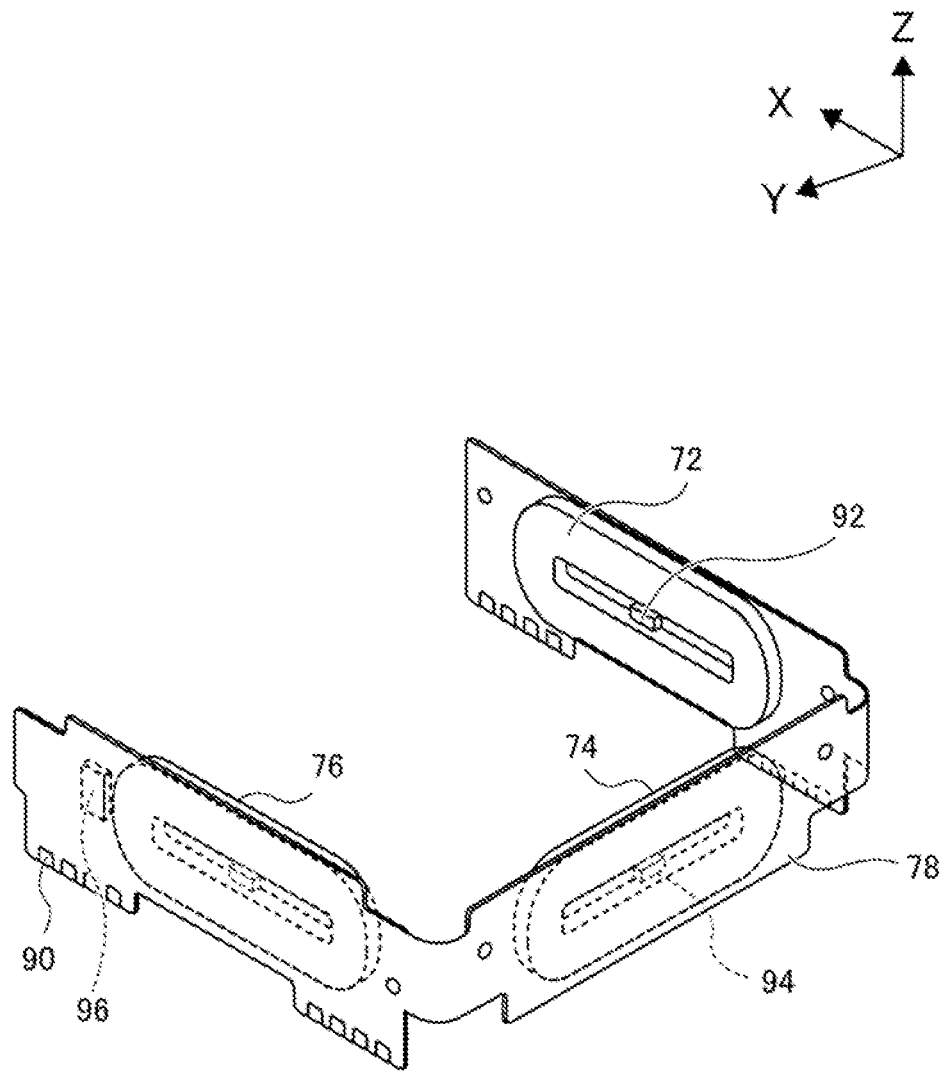
FIG. 5 is a perspective view illustrating a flexible printed substrate 78 to be attached to the fixed body 16 in FIG. 4.

As illustrated in FIG. 5, a Y direction position detection element 92 is disposed at the inside of the flexible printed substrate 78 at a center side of the first coil 72, an X direction position detection element 94 is disposed at a center side of the second coil 74, and a Z direction position detection element 96 is disposed at a position adjacent to the third coil 76.

The first coil 72 and the Y direction position detection element 92 are disposed inside the corresponding opening 88 so as face toward the inside of the base 80 and oppose the first magnet 52. Similarly, the second coil 74 and the X direction position detection element 94 are disposed inside the corresponding opening 88 so as to oppose the second magnet 54. The third coil 76 and the Z direction position detection element 96 are disposed inside the corresponding opening 88 so as to oppose the third magnet 66.

As illustrated in FIG. 1, the third magnetic member 70 that is configured by a magnetic body is disposed at the outer side of a portion of the flexible printed substrate 78 to which the third coil 76 is fixed so as to be parallel to the third coil 76. The third magnetic member 70 is fixed so as to be placed in close contact with a side face of the base 80 with the flexible printed substrate 78 interposed therebetween. The third magnetic member 70 thereby opposes the third magnet 66 across the flexible printed substrate 78 and the third coil 76.

Magnetic flux from the third magnet 66 flows in the third magnetic member 70, causing an attraction force to arise between the third magnet 66 and the third magnetic member 70. An attraction force accordingly acts on the movable body 18 in the Y direction with respect to the fixed body 16.

The third magnetic member 70 is formed with two divided openings 100, 100 that are divided into two parts in the X direction by a coupling portion 98 extending along the Z direction. The coupling portion 98 may extend along the X direction, in which case the divided openings 100, 100 would be divided into two parts in the Z direction. The third magnetic member 70 is formed from magnetic stainless steel or plated iron. By forming the third magnetic member 70 with the divided openings 100, 100, the attraction force between the third magnet 66 and the third magnetic member 70 can be adjusted to a desired strength. Namely, the attraction force between the third magnet 66 and the third magnetic member 70 can be set so as to be comparatively weak in comparison to a Z direction drive force between the third coil 76 and the third magnet 66. This enables the drive force required for Z direction movement to be made smaller, and also enables the damage imparted to an optical axis direction guide mechanism 102, described later, when subjected to external shock, to be reduced.

As illustrated in FIG. 1, the movable body 18 is supported by the optical axis direction guide mechanism 102 so as to be able to move in the Z direction with respect to the fixed body 16. Namely, the optical axis direction guide mechanism 102 guides the first frame 22 so as to allow movement along the Z axis direction with respect to the second frame 68. Namely, the lens support body 20 is thereby guided so as to be able to move along the optical axis direction together with the first frame 22. The optical axis direction guide mechanism 102 is configured by a third guide mechanism 104 and a fourth guide mechanism 106. The third guide mechanism 104 is configured by a +X side guide shaft 108 provided to the second frame 68 and a +X side guide hole 110 provided to the movable body 18 so as to house the +X side guide shaft 108. The fourth guide mechanism 106 is configured by a −X side guide shaft 112 provided to the second frame 68 and a −X side guide groove 114 provided to the movable body 18.

In the present exemplary embodiment, the +X side guide shaft 108 and the −X side guide shaft 112 are each formed as circular columns extending along the Z direction, and are for example formed from a ceramic, a metal, or a resin. The +X side guide shaft 108 and the −X side guide shaft 112 are each disposed in the vicinity of an inside corner of the side face of the base 80 where the third coil 76 is disposed. Note that although the +X side guide shaft 108 and the −X side guide shaft 112 each have a circular profile in a cross-section sectioned along the X-Y direction plane, this circular profile may be provided locally, or an elliptical profile may be adopted. A polygonal profile such as a square profile may also be adopted.

Lower side fixing portions 116, 116 are provided to a bottom face at the periphery of the through hole 84 in the base 80 at the vicinity of the corners of the side face where the third coil 76 is disposed. Each of the lower side fixing portions 116, 116 is formed with a cylindrical shaped insertion groove. Lower ends of the +X side guide shaft 108 and the −X side guide shaft 112 are inserted into the respective lower side fixing portions 116, 116 and fixed thereto. Both X direction ends of an upper end of the third magnetic member 70 described above are formed with upper side fixing portions 118, 118 that are folded in the Y direction. An insertion hole 120 is formed through each of the upper side fixing portions 118. Upper ends of the +X side guide shaft 108 and the −X side guide shaft 112 are inserted into the respective insertion holes 120, 120 and fixed thereto.

The +X side guide shaft 108 and the −X side guide shaft 112 are thus fixed to the base 80. The third magnetic member 70 thereby performs an additional function of supporting the +X side guide shaft 108 and the −X side guide shaft 112, enabling the number of components to be reduced in comparison to cases in which this support function is performed by a separate component, and enabling the +X side guide shaft 108 and the −X side guide shaft 112 to be stably supported.

Figure 6:
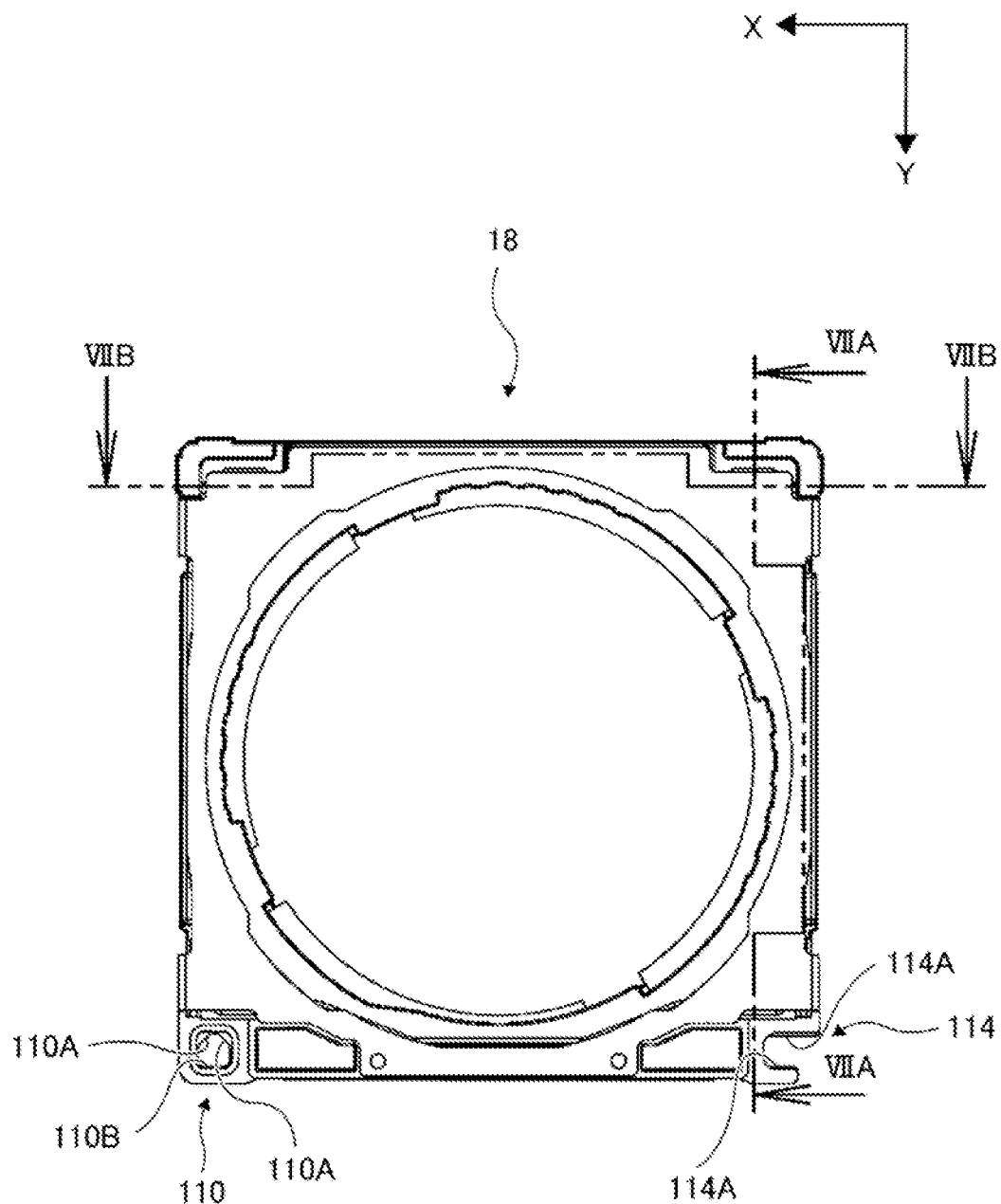
FIG. 6 is a plan view illustrating the movable body 18 in FIG. 2 as viewed from above.

As illustrated in FIG. 2 and FIG. 6, the +X side guide hole 110 is formed as a hollow through hole penetrating the second movable body plate 28 from a Z direction upper face to a Z direction lower face thereof. On the other hand, the −X side guide groove 114 extends so as to penetrate the second movable body plate 28 from the Z direction upper face to the Z direction lower face, and is formed as a groove opening toward the exterior in the −X direction.

Figure 10:
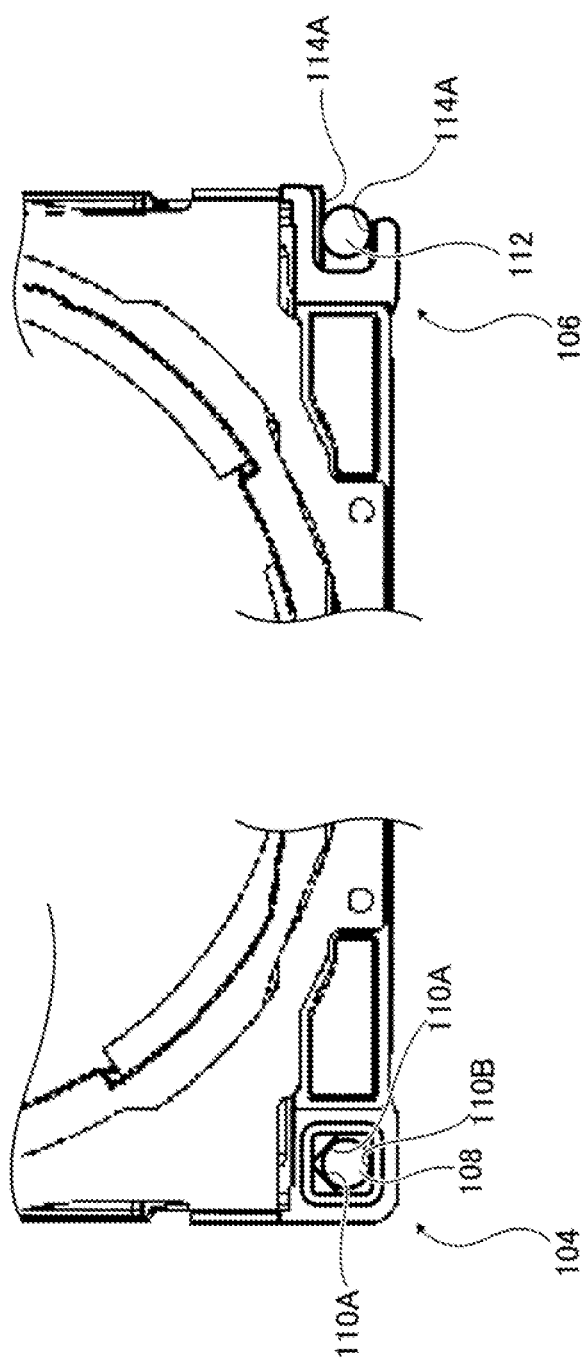
FIG. 10 is an enlarged plan view illustrating an optical axis direction guide mechanism 102 of the present exemplary embodiment as viewed from above.

As illustrated in FIG. 6 and FIG. 10, in cross-section viewed along an X-Y plane, the −Y side of the +X side guide hole 110 has a V-shaped profile opening toward the +Y side, this being the fixed body side, and the +Y side of the +X side guide hole 110 has a rectangular profile. Note that the +Y side may have a semicircular cross-section profile.

The attraction force between the third magnet 66 attached to the movable body 18 and the third magnetic member 70 draws the movable body 18 in the +Y direction. Accordingly, at least guide faces 110A, 110A forming the V-shaped profile on the −Y side of the +X side guide hole 110 make line contact with an outer surface of the +X side guide shaft 108 at two locations as viewed along the Z direction. This enables the movable body 18 to be positioned accurately with respect to the fixed body 16 in both the X direction and the Y direction. Note that although it is desirable for the rectangular portion of the +X side guide hole 110 to be provided with a minute gap to the outer surface of the +X side guide shaft 108 such that the two do not make line contact with each other, line contact is also acceptable therebetween.

In an X-Y plane cross-section, the −X side guide groove 114 is configured by two wall faces opposing each other in the Y direction. These two wall faces are respectively formed with protrusions 114A, 114A, each with a curved face profile protruding in the Y direction. As illustrated in FIG. 10, the center of at least the protrusion 114A on the −Y side contacts an outer surface of the −X side guide shaft 112. Namely, the −X side guide groove 114 and the −X side guide shaft 112 make point contact with each other at least at one point, such that frictional resistance therebetween is lower. Note that although it is desirable for the protrusion 114A on the +Y side to be provided with a minute gap to the outer surface of the −X side guide shaft 112 such that the two do not make point contact, line contact is also acceptable therebetween. In this manner, the movable body 18 is pressed by magnetic force against the +X side guide shaft 108 and the −X side guide shaft 112, and so the movable body 18 does not tilt with respect to the +X side guide shaft 108 and the −X side guide shaft 112. Note that an increase in the size of the lens 14 leads to an increase in the weight of the movable body 18 installed with the lens 14. In such cases, there has hitherto been a need to increase the required attraction force from this magnetic force, with the result that frictional force increases and drive force has had to be increased by at least an amount commensurate with the increase in the weight of the lens. However, in the present exemplary embodiment, employing the guide shaft structure obviates the need to increase the required attraction force using magnetic force, enabling the drive force to be kept small.

In the lens driving device 12, the first magnet 52 and the first coil 72 configure a drive mechanism to move the lens support body 20 along the Y axis direction with respect to the second movable body plate 28. When the first coil 72 is supplied with an electricity, a current flows in the X direction in the first coil 72. Since the first magnet 52 opposing the first coil 72 generates magnetic flux with a Z direction component, a Lorentz, force acts on the first coil 72 in the Y direction. Since the first coil 72 is fixed to the base 80, a reaction acting on the first magnet 52 acts as a drive force on the lens support body 20. The lens support body 20 accordingly moves in the Y direction, guided by the second guide mechanism 42.

After the lens support body 20 has moved in the Y direction, a current supply to the first coil 72 is turned off. When this is performed, the lens support body 20 stops at its position of the current supply to the first coil 72 being tuned off due to the attraction force between the first magnet 52 and the first magnetic member 56, the attraction force between the second magnet 54 and the second magnetic member 58, friction between the lower side guide projections 44 and the lower side guide grooves 46, and friction between the upper side guide projections 48 and the upper side guide grooves 50.

Moreover, the second magnet 54 and the second coil 74 configure a drive mechanism to move the lens support body 20 together with the first movable body plate 26 along the X axis direction with respect to the second movable body plate 28. When the second coil 74 is supplied with an electricity, a current flows in the Y direction in the second coil 74. Since the second magnet 54 opposing the second coil 74 generates magnetic flux having a Z direction component, a Lorentz force acts on the second coil 74 in the X direction. Since the second coil 74 is fixed to the base 80, a repulsion effect acting on the second magnet 54 acts as a drive force on the lens support body 20 and the first movable body plate 26. The lens support body 20 and the first movable body plate 26 accordingly move in the X direction, guided by the first guide mechanism 40.

After the lens support body 20 and the first movable body plate 26 have moved in the X direction, a current supply to the second coil 74 is turned off. When this is performed, the lens support body 20 together with the first movable body plate 26 stop at their positions of the current supply to the second coil 74 being turned off due to the attraction force between the first magnet 52 and the first magnetic member 56, the attraction force between the second magnet 54 and the second magnetic member 58, friction between the lower side guide projections 44 and the lower side guide grooves 46, and friction between the upper side guide projections 48 and the upper side guide grooves 50.

The third magnet 66, the third coil 76, and the third magnetic member 70 configure a drive mechanism to move the movable body 18 in the optical axis direction with respect to the fixed body 16. When the third coil 76 is supplied with an electricity, a current flows in the X direction in the third coil 76. Since the third magnet 66 opposing the third coil 76 generates magnetic flux in the Y direction, a Lorentz force acts on the third coil 76 in the Z direction. Since the third coil 76 is fixed to the base 80, a repulsion effect acting on the third magnet 66 acts as a drive force on the movable body 18, such that the movable body 18 moves in the Z direction, guided by the optical axis direction guide mechanism 102. Namely, the lens support body 20 moves in the optical axis direction.

After the movable body 18 has moved in the Z direction, a current supply to the third coil 76 is tuned off, and the lens support body 20 contained in the movable body 18 stops at its position of the current supply to the third coil 76 being turned off due to the attraction force between the third magnet 66 and the third magnetic member 70, friction between the +−X side guide shaft 108 and the +X side guide hole 110, and friction between the −X side guide shaft 112 and the −X side guide groove 114.

Consider a situation in which the camera device 10 is subjected to shock in the Y direction. Even were the +X side guide shaft 108 and the +X side guide hole 110, and the −X side guide shaft 112 and the −X side guide groove 114 to move away from one another, such movement away would be over a minute distance and the respective components would promptly return to their original positions, such that any damage sustained would be negligible. There is substantially no damage due to the lower side guide projections 44A, 44B and the lower side guide grooves 46A, 46B, as well as the upper side guide projections 48A, 48B and the upper side guide grooves 50A, 50B being respectively retained in a state of contact.

Consider a situation in which the camera device 10 is subjected to shock in the X direction. There is substantially no damage due to the +X side guide shaft 108 and the +X side guide hole 110, the −X side guide shaft 112 and the −X side guide groove 114, the lower side guide projections 44A, 44B and the lower side guide grooves 46A, 46B, and the upper side guide projections 48A, 48B and the upper side guide grooves 50A, 50B being respectively retained in a state of contact.

Consider a situation in which the camera device 10 is subjected to shock in the Z direction. There is substantially no damage due to the +X side guide shaft 108 and the +X side guide hole 110, and the −X side guide shaft 112 and the −X side guide groove 114, being retained in a state of contact. Even were the lower side guide projections 44A, 44B and the lower side guide grooves 46A, 46B, and the upper side guide projections 48A, 48B and the upper side guide grooves 50A, 50B, to move away from one another, such movement away would be over a minute distance and the respective components would promptly return to their original positions, and there would be substantially no damage due to these respective components being in line contact or face-to-face contact states.

Thus, regardless of the direction in which the camera device 10 is subjected to shock, any damage sustained by the lens driving device 12 of the present exemplary embodiment is negligible, or substantially no damage is sustained. This enables smooth movement of the lens support body 20 in each of the X, Y, and Z directions to be secured.

In the exemplary embodiment described above, explanation has been given regarding an example in which the lower side guide projections 44 and the upper side guide projections 48 are provided to the first movable body plate 26, the opposing lower side guide grooves 46 are provided to the second movable body plate 28, and the opposing upper side guide grooves 50 are formed on the lens support body 20. However, the arrangement of projections and grooves may be switched around, such that guide grooves are formed in upper and lower faces of the first movable body plate 26, and guide projections are formed on the second movable body plate 28 and the lens support body 20 so as to oppose these.

Alternatively, the arrangement may be switched around on the upper side alone or on the lower side alone.

Moreover, in the exemplary embodiment described above, explanation has been given regarding an example in which the first coil 72, the second coil 74, the third coil 76, and the third magnetic member 70 are attached to the fixed body 16, and the first magnet 52, the second magnet 54, and the third magnet 66 are attached to the movable body 18. However, the first coil 72, the second coil 74, the third coil 76, and the third magnetic member 70 may be attached to the movable body 18, while the first magnet 52, the second magnet 54, and the third magnet 66 may be attached to the fixed body 16.

Figure 11:
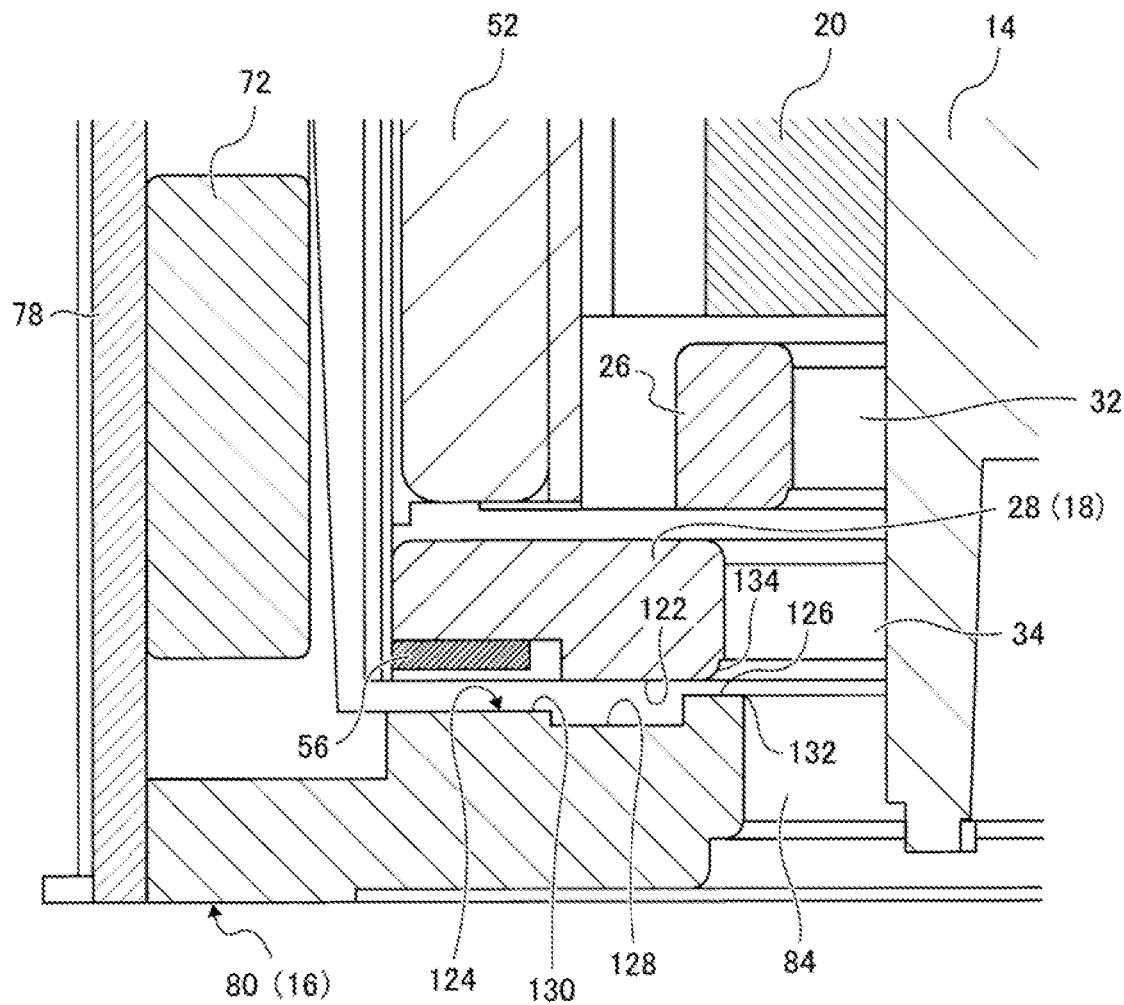
FIG. 11 is an X direction center cross-section of a camera device of the present exemplary embodiment as sectioned along a YZ direction plane.
Figure 12:
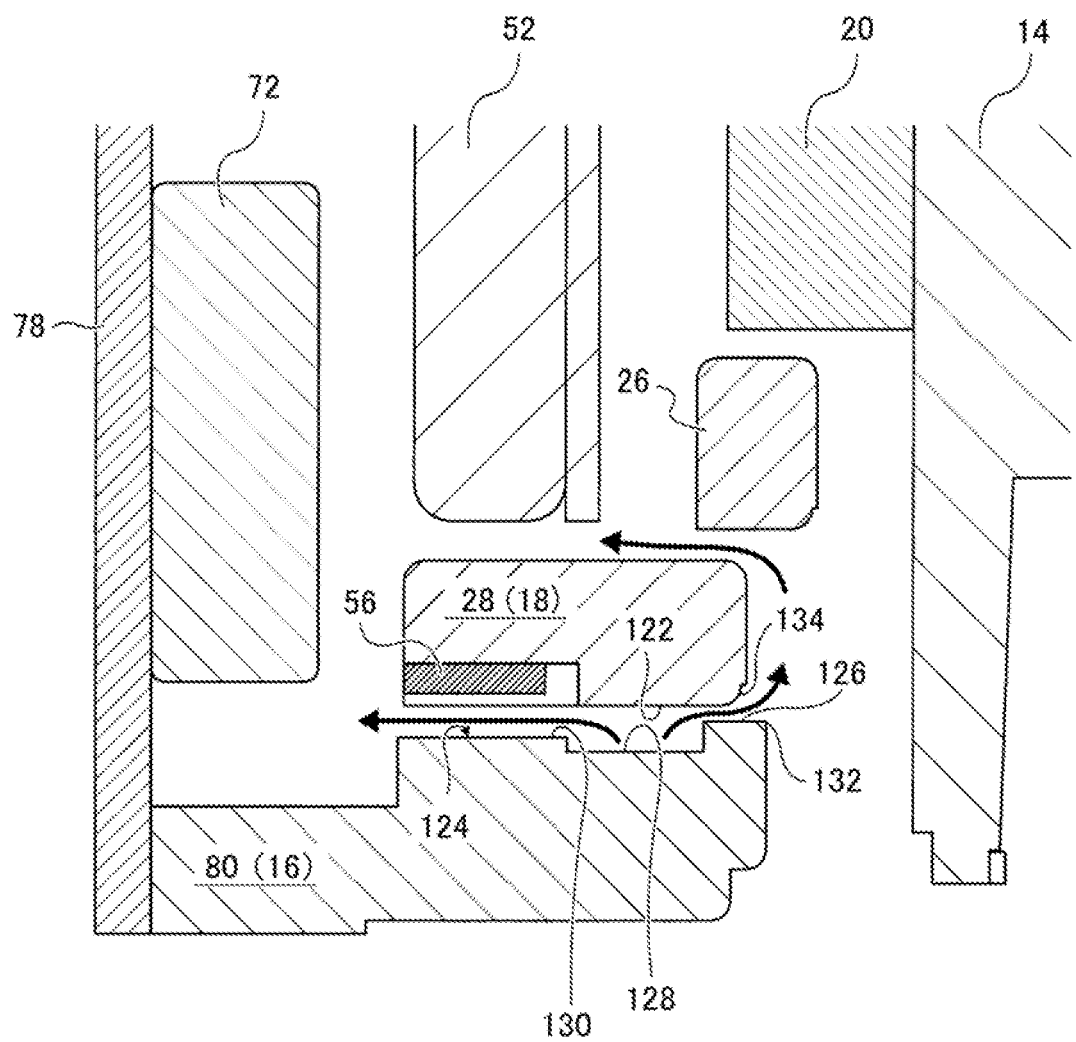
FIG. 12 is a cross-section illustrating a flow of air in cases in which a movable body of the present invention is moved in a -Z direction.

Further explanation now follows regarding the relationship between the fixed body 16 and the movable body 18, with reference to FIG. 11 and FIG. 12.

As stated above, the fixed body 16 includes the base 80, and the through hole 84 is formed in the base 80 to let light pass through from the lens 14. The light that has passed through the through hole 84 becomes focused light on an image sensor provided at a lower side of the through hole 84. An opposing face 124 is provided to the base 80 at the periphery of the through hole 84 and opposing a flat face 122 that is the lower face of the second movable body plate 28 serving as the movable body 18.

The opposing face 124 is provided with a protrusion 126 that protrudes in the Z direction and spans around the entire peripheral edge of the through hole 84. The opposing face 124 also includes a recess 128 provided peripherally outside the protrusion 126 and recessed in the −Z direction. The opposing face 124 moreover includes a body portion 130 provided peripherally outside the recess 128 and having a Z direction height lower than the Z direction height of the protrusion 126 and higher than the Z direction height of the recess 128. Moreover, an upper inside end of the protrusion 126 is not beveled, and is instead formed with a corner portion 132.

On the other hand, a lower inside end of the flat face 122 of the second movable body plate 28 is beveled to form a beveled portion 134. The beveled portion 134 opposes the protrusion 126 of the base 80. The upper inside end of the protrusion 126 is provided so as to be further inside than the lower inside end of the second movable body plate 28 where the flat face 122 is formed.

Moreover, the lens 14 includes a portion thereof disposed inside both an opening 34 and the through hole 84. This portion faces out in the XY directions and opposes a space between the second movable body plate 28 and the base 80. There is a gap formed in the Z direction between the first movable body plate 26 and the second movable body plate 28. There is moreover a passage formed at the outside of the body portion 130 of the base 80 such that there is no resistance to air escaping.

As stated above, the movable body 18 is supported by the optical axis direction guide mechanism 102 so as to be able to move with respect to the fixed body 16. Dust in the vicinity of the movable body 18 may be lifted up when the movable body 18 moves in the Z direction.

As illustrated in FIG. 12, air between the second movable body plate 28 and the base 80 will attempt to escape from both the outer peripheral side and the inner peripheral side when the movable body 18 moves in the −Z direction. However, the recess 128 is formed as an air trap and suppresses the amount of air trying to escape. Dust remains inside the recess 128 together with this air. Although air attempts to escape from the recess 128 toward both the outer peripheral side and the inner peripheral side, the protrusion 126 is situated at the inside of the recess 128, and the protrusion 126 makes it difficult for air to escape further to the inner peripheral side. On the other hand, the body portion 130, which is lower than the protrusion 126, is provided at the outer peripheral side of the recess 128, and a passage is also formed at the outside of the body portion 130 to let air escape. A greater part of the air in the recess 128 accordingly escapes toward the outside rather than toward the inside.

Moreover, the upper inside end of the protrusion 126 is further inside than the lower inside end of the second movable body plate 28 where the flat face 122 is formed, and so air attempting to escape from the recess 128 toward the inside is lifted up, namely attempts to move inside of the second movable body plate 28, from a site where the second movable body plate 28 ends. The beveled portion 134 is moreover formed at the lower inside end of the second movable body plate 28, and air that has escaped from the recess 128 toward the inside escapes more readily and smoothly toward the inside of the second movable body plate 28. Moreover, due to the upper inside end of the protrusion 126 not being beveled and instead being formed with the corner portion 132, air is not liable to escape downward. A space between the second movable body plate 28 and the base 80 is opposed by the lens 14, and so air that has escaped toward the inside of the second movable body plate 28 is guided upward. Furthermore, due to the presence of the gap provided between the first movable body plate 26 and the second movable body plate 28, air that has been guided upward from inside the second movable body plate 28 is led into the gap between the first movable body plate 26 and the second movable body plate 28. This enables a reduction in the dust that falls downward through the through hole 84.

In the exemplary embodiment described above, explanation has been given regarding the lens driving device 12 employed in the camera device 10. However, the present invention may also be applied in other devices.

The invention claimed is:

1. A lens driving device comprising:
    a movable body including a first movable body plate configured to support a lens support body so as to be able to move in a direction orthogonal to an optical axis direction of a lens, and a second movable body plate configured to support the first movable body plate so as to be able to move in a direction orthogonal to the movement direction of the first movable body plate; and
    a fixed body configured to support the movable body so as to be able to move in the optical axis direction of the lens; wherein
    the fixed body includes a through hole through which light from the lens passes, and an opposing face that is formed at a periphery of the through hole in a direction orthogonal to the optical axis direction and that opposes the second movable body plate;
    the opposing face is provided with a protrusion protruding toward the movable body side at a peripheral edge of the through hole, and with a recess peripherally outside the protrusion and recessed toward the movable body side; and
    the movable body includes an opening to let light from the lens pass through and a flat face formed at a periphery of the opening in a direction orthogonal to the optical axis direction and disposed opposing the protrusion and the recess.

2. The lens driving device of claim 1, wherein the opposing face is further provided with a body portion disposed peripherally outside the recess and having a height intermediate between heights of the protrusion and the recess.

3. The lens driving device of claim 2, wherein a passage for letting air escape is formed at a periphery of the body portion of the fixed body.

4. The lens driving device of claim 1, wherein an upper inside end of the protrusion is disposed further inside than a lower inside end of the movable body where the flat face is formed.

5. The lens driving device of claim 1, wherein the lower inside end of the movable body where the flat face is formed is beveled so as to provide a beveled portion, and the beveled portion opposes the protrusion in the optical axis direction.

6. The lens driving device of claim 5, wherein an upper inside end of the protrusion is formed with a corner portion.

7. The lens driving device of claim 1, wherein the lens support body, the first movable body plate, and the second movable body plate are provided so as to overlap with each other in the optical axis direction and such that gaps are formed between each other.

8. A camera device comprising:
a lens driving device; and
a lens supported by the lens support body, wherein
the lens driving device includes:
    a movable body including a first movable body plate configured to support a lens support body so as to be able to move in a direction orthogonal to an optical axis direction of a lens, and a second movable body plate configured to support the first movable body plate so as to be able to move in a direction orthogonal to the movement direction of the first movable body plate; and
    a fixed body configured to support the movable body so as to be able to move in the optical axis direction of the lens; wherein
    the fixed body includes a through hole through which light from the lens passes, and an opposing face that is formed at a periphery of the through hole in a direction orthogonal to the optical axis direction and that opposes the second movable body plate;
    the opposing face is provided with a protrusion protruding toward the movable body side at a peripheral edge of the through hole, and with a recess peripherally outside the protrusion and recessed toward the movable body side; and
    the movable body includes an opening to let light from the lens pass through and a flat face formed at a periphery of the opening in a direction orthogonal to the optical axis direction and disposed opposing the protrusion and the recess.

9. An electronic apparatus comprising a camera device including:
a lens driving device; and
a lens supported by the lens support body, wherein
the lens driving device includes:
    a movable body a first movable body plate configured to support including a lens support body so as to be able to move in a direction orthogonal to an optical axis direction of a lens, and a second movable body plate configured to support the first movable body plate so as to be able to move in a direction orthogonal to the movement direction of the first movable body plate; and
    a fixed body configured to support the movable body so as to be able to move in the optical axis direction of the lens; wherein
    the fixed body includes a through hole through which light from the lens passes, and an opposing face that is formed at a periphery of the through hole in a direction orthogonal to the optical axis direction and that opposes the second movable body plate;
    the opposing face is provided with a protrusion protruding toward the movable body side at a peripheral edge of the through hole, and with a recess peripherally outside the protrusion and recessed toward the movable body side; and
    the movable body includes an opening to let light from the lens pass through and a flat face formed at a periphery of the opening in a direction orthogonal to the optical axis direction and disposed opposing the protrusion and the recess.

* * * * *